US007025184B2

(12) United States Patent
Baba

(10) Patent No.: US 7,025,184 B2
(45) Date of Patent: Apr. 11, 2006

(54) HYDRAULIC SHOCK ABSORBER WITH SELF LEVELING FUNCTION FOR VEHICLE HEIGHT

(75) Inventor: Tomohiko Baba, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 10/901,451

(22) Filed: Jul. 29, 2004

(65) Prior Publication Data

US 2005/0051398 A1 Mar. 10, 2005

(30) Foreign Application Priority Data

Aug. 1, 2003 (JP) ............................ 2003-284944

(51) Int. Cl.
*F16F 9/34* (2006.01)
*B60G 17/00* (2006.01)

(52) U.S. Cl. ............... 188/315; 188/322.19; 267/64.16

(58) Field of Classification Search ........ 188/313–315, 188/297, 322.19, 322.21; 267/64.11, 64.13, 267/64.14, 64.15, 64.16, 64.17, 64.28
See application file for complete search history.

(56) References Cited

U.S. PATENT DOCUMENTS 2,207,088 A * 7/1940 Coleman ................ 267/64.26
3,991,863 A * 11/1976 Lee ........................... 188/289
4,240,531 A * 12/1980 Postema .................... 188/315
5,062,616 A 11/1991 Sommer
6,793,049 B1 * 9/2004 Kazmirski ................. 188/275

FOREIGN PATENT DOCUMENTS

GB 1 279 885 6/1972

* cited by examiner

*Primary Examiner*—Pam Rodriguez
(74) *Attorney, Agent, or Firm*—Rabin & Berdo, PC

(57) ABSTRACT

A hydraulic shock absorber with a self leveling function for a vehicle height is provided to prevent drop of a relief valve even if an excessive impulsive pressure is applied thereto. The relief valve is provided with a tubular valve case which is press-fitted into a press-fit bore of a partition wall member to divide an oil storage and a reservoir, and a valve body opening/closing a valve seat of an end portion of a flow passage formed in the partition wall member is urged toward the direction of the valve seat by a spring and is seated at the valve seat. This prevents an oil pressure in an oil chamber of the reservoir from acting directly on an end face of the valve case.

3 Claims, 2 Drawing Sheets

HYDRAULIC SHOCK ABSORBER WITH SELF LEVELING FUNCTION FOR VEHICLE HEIGHT

BACKGROUND OF THE INVENTION

1. Field of the Invention

The present invention relates to a hydraulic shock absorber with a self leveling function for a vehicle height and in particular, to an improvement of a relief valve which prevents a rapid increase of oil pressure inside a reservoir.

2. Background Information

Japanese Unexamined Patent Publication No. 9-42356A has disclosed a hydraulic shock absorber with a self leveling function for a vehicle height. This hydraulic shock absorber is equipped with a relief valve to regulate a pressure increase in a reservoir thereof, so that when a bumping force from a road surface exerts on the hydraulic shock absorber during vehicle traveling, a rapid increase of an oil pressure in the reservoir is avoided to prevent a jolt generation due to the bump force.

SUMMARY OF THE INVENTION

The relief valve is disposed between the reservoir and a supplementary oil storage, which is opened when the oil pressure in the reservoir increases, to escape the pressure therein. The relief valve is, however, required to be so securely fixed that it does not drop off when an impulsive-high pressure exerts on the relief valve itself.

And also it is preferable that the relief valve is properly sub-assembled so that in assembling the hydraulic shock absorber the relief valve does not hinder the assembling work.

Further, in the case of mounting a hydraulic shock absorber to each of all front and rear wheels for a vehicle, a setting pressure in each relief valve of four hydraulic shock absorbers valve can be preferably adjusted to correspond with each other.

In view of the above, there exists a need for a hydraulic shock absorber with a self leveling function for a vehicle height which overcomes the above-mentioned problems in the related art. The present invention addresses this need in the related art, as well as other needs, which will become apparent to those skilled in the art from this disclosure.

The present invention has an object of solving the foregoing problems.

Therefore, one aspect of the present invention is to provide a hydraulic shock absorber with a self leveling function for a vehicle height which comprises a cylinder, a piston disposed in the cylinder to define two oil chambers in the cylinder, a piston rod connected to the piston, an outer tube disposed co-axially with the cylinder outside the cylinder, a partition wall member to divide a circular space between the cylinder and the outer tube to form a reservoir communicating with the oil pressure chambers and a supplementary oil storage, and a pumping device which supplies an operating oil from the oil storage to the oil chambers caused by expansion/contraction movements of the piston rod to increase pressure in the cylinder. The hydraulic shock absorber with the self leveling function for the vehicle height further comprises a flow passage disposed in the partition wall member to communicate the reservoir with the oil storage, and a relief valve which opens the flow passage when pressure in the reservoir increases by more than a predetermined value, the relief valve includes a valve seat disposed continuously with the flow passage and facing a side of the oil storage, a hollow valve case surrounding the valve seat and press-fitted at one end into the partition wall member, and a valve body disposed in the valve case and urged by a spring so as to be seated at the valve seat.

These and other objects, features, aspects and advantages of the present invention will become apparent to those skilled in the art from the following detailed description, which, taken in conjunction with the annexed drawings, discloses a preferred embodiments of the present invention.

BRIEF DESCRIPTION OF THE DRAWINGS

Referring now to the attached drawings which form a part of this original disclosure.

THE PREFERRED EMBODIMENT OF THE INVENTION

Figure 1:
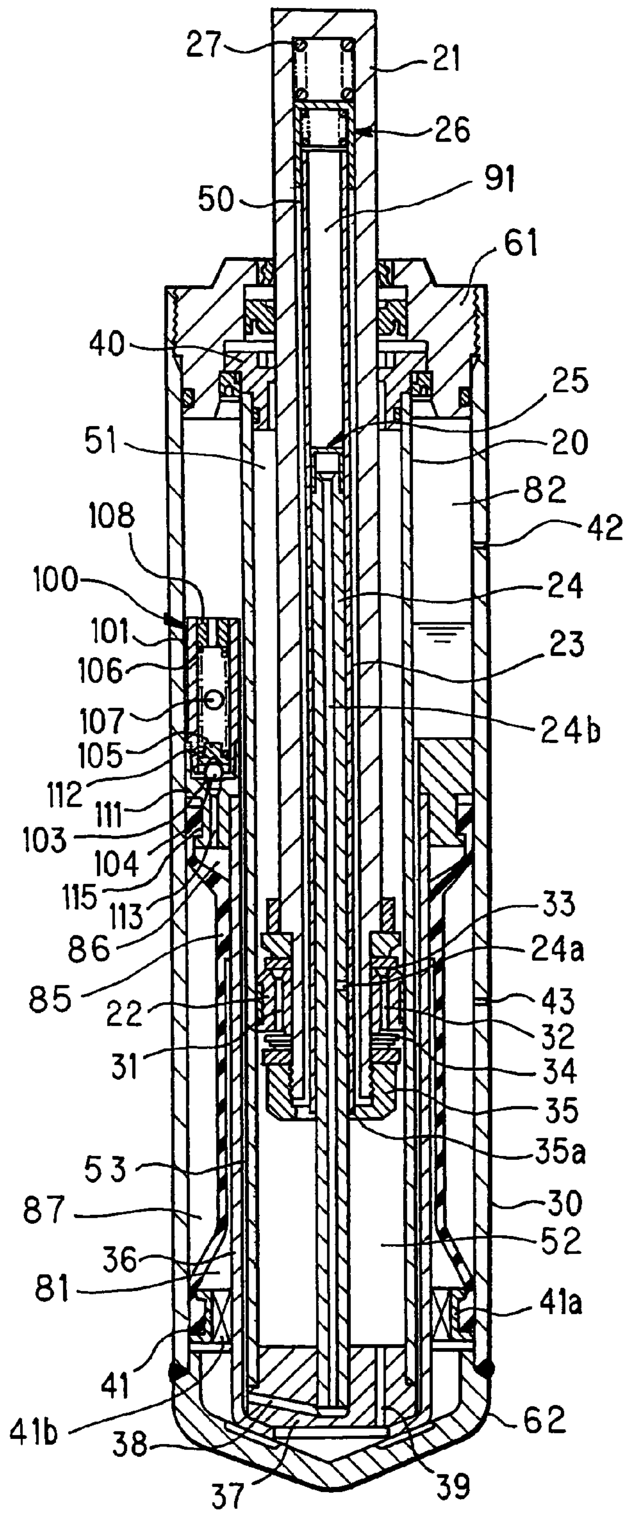
FIG. 1 is a cross sectional view of an entirety of an embodiment according to the present invention.

Selected embodiment of the present invention will now be explained with reference to the drawings. It will be apparent to those skilled in the art from this disclosure that the following description of the embodiment of the present invention is provided for illustration only, and not for the purpose of limiting the invention as defined by the appended claims and their equivalents.

A hydraulic shock absorber with a self leveling function for a vehicle height will be explained with reference to FIG. 1.

The hydraulic shock absorber with the self leveling function for the vehicle height is equipped with a cylinder 20 and an outer tube 30 disposed co-axially with the cylinder 20 outside thereof. A piston 22 connected to a piston rod 21 is disposed inside the cylinder 20, which defines two oil chambers inside the cylinder 20, namely an oil chamber 51 in a side of the piston rod 21 and an oil chamber 52 in a side of the piston 22. An operating oil is sealed into the oil chambers 51, 52.

Ports 31, 32 communicating the rod-side oil chamber 51 with the piston-side oil chamber 52 are disposed in the piston 22, and leaf springs 33, 34 are disposed in each of outlet ends of the ports 31, 32. Accordingly the port 31 allows only one-way flow of the operating oil from the rod-side oil chamber 51 to the piston-side oil chamber 52 and the other port 32 allows only one-way flow of the operating oil from the piston-side oil chamber 52 to the rod-side oil chamber 51.

A rod guide 40 is fittingly inserted in an upper end of the cylinder 20 to support the piston rod 21 at an inner surface of the rod guide 40 and a bottom member 37 is fittingly inserted in a lower end of the cylinder 20 likewise.

A tube body 36 is spaced by a predetermined clearance from an outer surface of the cylinder 20, which covers from the bottom member 37 in the lower end of the cylinder 20 to a central part of the cylinder 20.

A head cap 61 is screwed into a top end of the outer tube 30 disposed co-axially with cylinder 20 and a bottom cap 62 is welded to a lower end of the outer tube 30 where an inside of the outer tube 30 is sealed with the head cap 61 and the bottom cap 62. And the rod guide 40 is secured to the head cap 61, the bottom member 37 and the lower end of the tube body 36 are secured to the bottom cap 62, and both ends of the cylinder 20 are secured respectively to the head cap 61 and the bottom cap 62. As a result, each of the above-described members is secured to the outer tube 30. Further, sealing members are disposed in an outer surface and an inner surface of the head cap 61 to seal between the piston rod 21 and the head cap 61 and between the outer tube 30 and the head cap 61 where accordingly the inside of the outer tube 30 is sealed.

A clearance between the cylinder 20 and the tube body 36 is designed to form a circular oil passage 53. A circular partition wall member 111 of a flange type is press-fitted in an upper end of the tube body 36, as well as the partition wall member 111 is closely contacted with the inner surface of the outer tube 30. Accordingly the partition wall member 111 defines a reservoir 81 formed between the outer tube 30 and the tube body 36 and a supplementary oil storage 82 formed above the reservoir 81 and between the cylinder 20 and the outer tube 30.

A tubular, flexible bladder 85 is disposed in the reservoir 81, which defines a bladder-inside oil chamber 86 and a bladder-outside gas chamber 87 inside the reservoir 81. An upper end of the bladder 85 is engaged to a circular groove 115 formed in a lower, outer surface of the partition wall member 111 and a lower end of the bladder 85 is engaged to a circular groove 41*a* in an outer surface of a circular stopper 41 fitted into a lower, outer surface of the tube body 36.

The oil chamber 86 of the reservoir 81 is communicated with the piston-side oil chamber 52 through a notch 41*b* formed in the stopper 41 and a port 39 formed in the bottom member 37 and is filled with an operating oil. And a gas is sealed in the gas chamber 87.

The oil storage 82 is filled with the gas and the operating oil and is communicated with the circular oil passage 53 between the cylinder 20 and the tube body 36. Further, charging the gas inside the gas chamber 87 and the oil storage 82 is performed through bores 42, 43 formed in the outer tube 30 and after gas filling, the bores 42, 43 are closed by resistance-welding with a steel ball.

The partition wall member 111, as described above, separates the reservoir 81 and the oil storage 82 and a relief valve 100 is disposed therein to be opened when pressure in the oil chamber 86 of the reservoir 81 increases by more than a predetermined value, to escape the operating oil from the oil chamber 86 to the oil storage 82.

Figure 2:
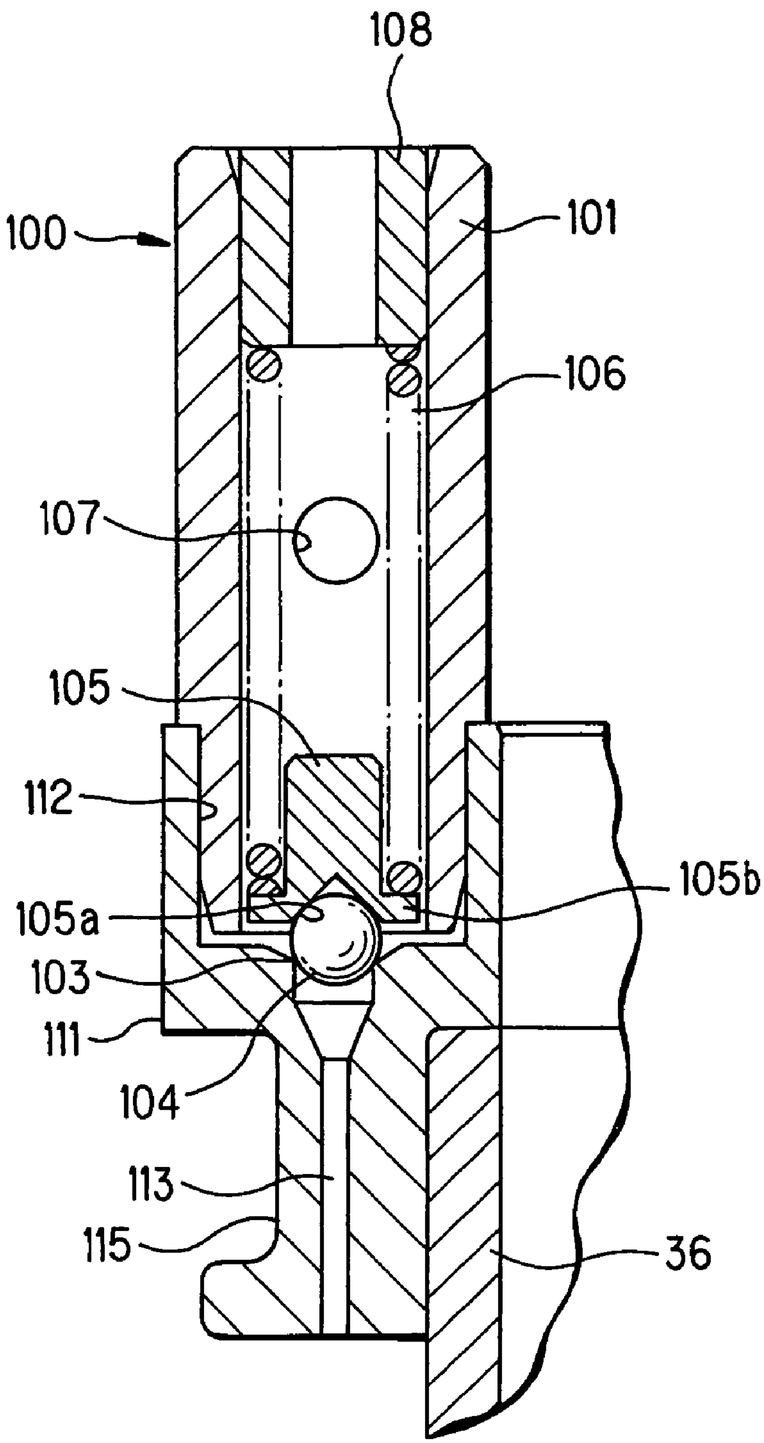
FIG. 2 is an enlarged cross sectional view of a relief valve of the embodiment.

The relief valve 100 is constructed in detail as FIG. 2.

The relief valve 100 is equipped with a tubular valve case 101 a lower end of which is press-fitted and secured in a press-fit bore 112 disposed in a part of the partition wall member 111. Further, a penetrating bore 107 is formed in a side face of the valve case 101 to communicate between an inside and an outside of the valve case 101. A flow passage 113 having a small diameter is disposed in the partition wall member 111 to penetrate there through in the upward and downward directions, to communicate with the press-fit bore 112 of the partition wall member 111, as well as a conical valve seat 103 is on a shoulder between the flow passage 113 and the press-fit bore 112.

A spherical valve body 104 is arranged in the valve case 101 and is seated on the valve seat 103. A holder 105 is disposed on an upward side of the valve body 104, which is in contact with a conical holding face 105*a* formed in a lower face of the holder 105. A spring 106 is interposed between an upper end of a flange portion 105*b* of the holder 105 and a tubular stopper 108 press-fitted in an inner side at an upper end of the valve case 101, to urge the valve body 104 to closely contact the valve seat 103, and is designed to close the flow passage 113 in a normal time.

The relief valve 100 is constructed as describe above where the flow passage 113 of the partition wall member 111 is connected to the oil chamber 86 of the reservoir 81, and the penetrating bore 107 of the valve case 101 and an opening of the stopper 108 are connected to the oil storage 82. Accordingly as an oil pressure in the flow passage 113 of the relief valve 100 increases, the valve body 104 moves against an urging force of the spring 106 toward an upward direction in FIG. 2 to be away from the valve seat 103, thereby to open the flow passage 113. Thereby an operating oil in the oil chamber 86 enters into the valve case 101 through a clearance generated between the valve body 104 and the valve seat 103 and flows into the oil storage 82 through the penetrating bore 107 or an upper opening of the stopper 108.

A valve-opening pressure with which the valve body 104 leaves away from the valve seat 103 at this moment can be adjusted by a spring force of the urging spring 106.

The holder 105 can be omitted, but since the holder 105 prevents the spherical valve body 104 from moving out of position in the right/left directions in FIG. 2, the valve body 104 is seated stably at a desired position of the valve seat 103. The stable seat position of the valve body 104 to the valve seat 103 allows a stable valve-opening pressure of the relief valve 100. Further, the valve body 104 and the holder 105 may be integrally molded and the valve body 104 may be formed in a puppet-type shape.

Moreover, the stopper 108 may be a solid body, not tubular. In this case the penetrating bore 107 may be connected to a downstream side of the flow passage 113. And in the case of using a tubular stopper 108, the penetrating bore 107 may be omitted. Further, one end of the spring 106 is supported on the stopper 108, but the valve case 101 may be formed in a tubular shape with a bottom an inner face of which may support the one end of the spring 106.

When the valve case 101 of the relief valve 100 is made to be press-fitted into the press-fit bore 112 of the partition wall member 111, an axial insert length of the valve case 101 into the press-fit bore 112 is adjusted, and thereby an initial load by the spring 106 urging the valve body 104 can be adjusted. Accordingly the valve-opening pressure of the valve body 104 can be easily adjusted and even if a spring force of the spring 106 is not uniform, the valve-opening pressure can be adjusted by the above adjustment of the axial insert length, to manufacture the relief valve 100 with a uniform valve-opening pressure.

In this relief valve 100, even if an impulsive and large pressure is applied from a side of the flow passage 113 of the partition wall member 111, a force pushing the valve case 101 upward in FIG. 2 is only a spring reaction generated when the valve body 104 is lifted due to relief operation. Accordingly a force traveling the valve case 101 upward in FIG. 2 becomes small. As a result, even if the impulsive and large pressure is applied, it is prevented that the valve case 101 drops from the partition wall member 111.

In the relief valve 100 the valve body 104 and the spring 106 are covered with the valve case 101, which prevents a tool or the like to be used when the flange-typed partition wall member 111 is press-fitted into an outer face at an upper end of the tubular body 36 from interfering directly with the valve body 104 or the spring 106, and enables the relief valve 100 to be press-fitted into the outer face at the upper end of the tubular body 36 with relief valve 100 still assembled.

Back to FIG. 1, a pumping device will be explained, which is arranged in the piston rod and performs self-leveling for a vehicle height by supplying the operating oil of the oil storage 82 to the piston-side oil chamber 51 due to expansion/contraction movements of the piston rod 21.

The piston rod 21 is inserted in an axis portion of the piston 20 positioned in the cylinder, and piston 20 is secured to a tip of the piston rod 21 by a piston nut 35 screwed into the tip of the piston rod 21. The piston rod 21 is formed of a pipe a lower side of which is opened and a tubular pump tube 23 equipped with a one-way valve 26 disposed at a top end thereof is inserted in the piston rod 21. A circular oil passage 50 is formed between the pump tube 23 and an inner surface of the piston rod 21 and the circular oil passage 50 is communicated at a lower end with the piston-side oil chamber 52.

The pump tube 23 is urged toward the downward direction FIG. 1 by an urging spring 27 interposed between a top end of the one-way valve 26 and an inner surface at a top end of the piston rod 21, as well as a lower end of the pump tube 23 contacts an engagement portion 35*a* disposed in a lower end at an inner surface of the piston nut 35. Thus the pump tube 23 can move in an axial direction inside the piston rod 21 by a predetermined distance.

A pipe-shaped pump rod 24 connected at a lower end to an axis portion of the above bottom member 37 is slidably inserted inside the pump tube 23 and a one-way valve 25 is disposed on a top end of the pump rod 24.

A pump chamber 91 is defined inside the above pump tube 23 by the one-way valve 26 disposed in the top end of the pump tube 23 and the one-way valve 25 disposed on the top end of the pump rod 24. The pump chamber 91 is enlarged or compressed due to the piston rod 21 moving together with the piston 20. The one-way valve 26 allows only flow of the operating oil from the pump chamber 91 to the circular oil passage 50, and the one-way valve 25 allows only flow of the operating oil from an inner passage 24*b* of the pump rod 24 to the pump chamber 91. Accordingly when the pump chamber 91 is enlarged, the one-way valve 25 opens to suck in the operating oil from the inner passage 24*b* to the pump chamber 91 and on the other hand, when the pump chamber 91 is compressed, the one-way valve 26 opens to discharge the operating oil of the pump chamber 91 to the circular passage 50.

The inner passage 24*b* of the pump rod 24 is connected at a lower end to the circular oil passage 53 via a port 38 formed in the bottom member 37. And a penetrating bore 24*a* is formed in the radial direction at the middle of the pump rod 24. As a result, an inside of the pump rod 24 is communicated with the above oil storage 82 through the port 38 and the circular oil passage 53.

A hydraulic shock absorber with self leveling function for a vehicle height according to the present invention is constructed as described above and operations thereof will be explained.

When the hydraulic shock absorber with self leveling function for the vehicle height is expanded, since the piston 22 travels upward to the cylinder 20, a volume of the rod-side oil chamber 51 is reduced to increase an oil pressure of the rod-side oil chamber 51, which pushes and opens the leaf valve 34 and enters into the piston-side oil chamber 52 through the port 32. On the other hand, since the piston-side oil chamber 52 lacks the operating oil equal to the volume of the operating oil the piston rod 21 expels from the cylinder 20, the operating oil enters into the piston-side oil chamber 52 from the oil chamber 86 of the reservoir 81 by the above lacking amount and at the same time, the gas chamber 87 of the reservoir 81 expands by the volume of the operating oil flown out of the oil chamber 86. Then, the hydraulic shock absorber generates a dumping force corresponding to a resistance generated when the operating oil passes through the leaf valve 34 of the piston 22.

Next, when the hydraulic shock absorber is contracted, since the piston 22 travels downward to the cylinder 20, a volume of the piston-side oil chamber 52 is reduced to increase an oil pressure of the piston-side oil chamber 52, which pushes and opens the leaf valve 33 and enters into the rod-side oil chamber 51 through the port 31. On the other hand, since the piston-side oil chamber 52 has a surplus of the operating oil equal to the volume of the operating oil the piston rod 21 enters into the cylinder 20 to expel, the operating oil enters from the piston-side oil chamber 52 to the oil chamber 86 of the reservoir 81 by the surplus amount and at the same time, the gas chamber 87 of the reservoir 81 is contracted by the volume of the operating oil flown into the oil chamber 86. Then, the hydraulic shock absorber generates a dumping force corresponding to a resistance generated when the operating oil passes through leaf valve 33 of the piston 22.

As described above, in the hydraulic shock absorber with the self leveling function for the vehicle height, the dumping force is generated on expansion and contraction thereof, and in case the lower end of the piston nut 35 is situated in a position lower than the penetrating bore 24*a* of the pump rod 24, namely in the range where the penetrating bore 24*a* is not exposed under a lower face of the piston 22, an averaging stroke position of the hydraulic shock absorber is automatically adjusted to be in an expansion side to increase a vehicle height.

In case the lower end of the piston nut 35 is in a position lower than the penetrating bore 24*a* of the pump rod 24 on expansion of the hydraulic shock absorber, the pump chamber 91 is reduced in pressure since the volume thereof is expanded due to an upward movement of the piston rod 21, and the one-way valve 25 disposed on the top end of the pump rod 24 is opened. Therefore, the operating oil in the oil storage 82 enters into the pump chamber 91 via the circular passage 53, the port 38, and the passage 24*b* in the pump rod 24.

Next, when the hydraulic shock absorber is contracted, the piston rod 21 enters into the cylinder and the pump chamber 91 is contracted, to increase an oil pressure in the pump chamber 91. Then, the operating oil of the pump chamber 91 pushes and opens the one-way valve 26 disposed in the top end of the pump tube 23 to enter into the piston-side oil chamber 52 via the circular oil passage 50.

Namely according to the hydraulic shock absorber with the self leveling function for the vehicle height, the operating oil can be automatically supplied inside the piston-side oil chamber 52 caused by the expansion/contraction movements thereof, thereby to increase the gas pressure in the gas chamber 87 in the reservoir 81. As the pressure of the gas chamber 87 is increased, an expansion fore of the hydraulic shock absorber becomes larger due to a difference between pressure-receiving areas of the piston-side oil chamber 52 and the rod-side oil chamber 51 of the piston 22. Namely since the pressure of the gas chamber 87 gradually increases by the expansion/contraction movements, the vehicle height can be gradually increased.

On the other hand, in case the lower end of the piston nut 35 is in a position higher than the penetrating bore 24*a* of the pump rod 24 on expansion of the hydraulic shock absorber, the pump chamber 91 is reduced in pressure since the volume thereof is expanded due to an upward movement of the piston rod 21, to open the one-way valve 25 disposed on the top end of the pump rod 24. Since the passage 24*b* of the pump rod 24 is, however, communicated with the piston-side oil chamber 52 through the penetrating bore 24*a*, a part of the operating oil in the piston-side oil chamber 52 enters through the pump rod 24 into the pump chamber 91. And when the hydraulic shock absorber is contracted under this condition, this time the pump chamber 91 is contracted, to increase an oil pressure in the pump chamber 91. Then, the operating oil of the pump chamber 91 pushes and opens the one-way valve 26 disposed in the top end of the pump tube 23 to enter into the piston-side oil chamber 52 via the circular oil passage 50.

Since in this case, the operating oil is not supplied from the oil storage 82, the gas pressure in the gas chamber 87 of the reservoir 81 is not increased. Accordingly, this hydraulic shock absorber with the self leveling function for the vehicle height, in a condition where the penetrating bore 24*a* is not communicated with the piston-side oil chamber 52, increases the vehicle height and when the penetrating bore 24*a* become communicated with the piston-side oil chamber 52, maintains the vehicle height as it is.

The hydraulic shock absorber with the self leveling function for the vehicle height operates as described above and the relief valve 100 will operate as follows. In case an impulsive, large force caused by the vehicle receiving pressure from a bump of a road during vehicle traveling is applied to the hydraulic shock absorber with the self leveling function for a vehicle height, the piston-side oil chamber 52, and the gas chamber 87 and oil chamber 86 of the reservoir 81 are rapidly pressurized. Then the relief valve 100 is opened to escape the operating oil of the oil chamber 86 to the oil storage 82. Namely a rapid increase in pressures of the piston-side oil chamber 52, the gas chamber 87, and the oil chamber 86 is prevented to ease an impact to a vehicle body.

At this moment, even if an impulsive, large force is applied to the relief valve 100 from the flow passage 113 of the partition wall member 111, a force traveling the valve case 101 upward in FIG. 2 is made to be small as described above. Accordingly even if the impulsive, large force is applied to the valve case 101, it prevents the valve case 101 from dropping out of the press-fit bore 112 of the partition wall member 111.

In particular an increase of a gas pressure in the gas chamber 87 of the reservoir 81 prevents the valve case 101 from dropping out of the partition wall member 111 even in the hydraulic shock absorber with the self leveling function for the vehicle height having a function self-leveling the vehicle height, thereby to provide no occurrence of defects of a self leveling function for a vehicle height caused by the valve case 101 dropping during vehicle traveling.

And since there is no possibility that the valve case 101 drops from the partition wall member 111 and hits the rod guide 40 or the head cap to damage them, it is possible to maintain a good performance of the hydraulic shock absorber with the self leveling function for the vehicle height.

Further, since a valve-opening pressure of the relief valve 100 is uniform, it is possible to manufacture a hydraulic shock absorber with a uniform self leveling function for a vehicle height. And since in the case of a vehicle with four wheels, valve-opening pressures of the relief valves in the hydraulic shock absorbers with the self leveling function for the vehicle height disposed in four locations between a vehicle body and a vehicle axis are uniform, it is possible to improve a vehicle ride comfort.

This application claims priority to Japanese Patent Application No. 2003-284944. The entire disclosure of Japanese Patent Application No. 2003-284944 is hereby incorporated herein by reference.

While only selected embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiment according to the present invention is provided for illustration only, and not for the purpose of limiting the invention as defined by the appended claims and their equivalents.

What is claimed is:

1. A hydraulic shock absorber with a self leveling function for a vehicle height, comprising:

a cylinder;

a piston disposed in the cylinder to define two oil chambers in the cylinder;

a piston rod connected to the piston;

an outer tube disposed co-axially with the cylinder outside the cylinder;

a partition wall member to divide a circular space between the cylinder and the outer tube to form a reservoir communicating with the oil chambers and a supplementary oil storage; and a pumping device which supplies an operating oil from the supplementary oil storage to the oil chambers caused by expansion/contraction movements of the piston rod to increase pressure in the cylinder, the hydraulic shock absorber further comprising:

a flow passage disposed in the partition wall member to communicate the reservoir with the supplementary oil storage, the flow passage communicating with a press-fit bore formed in the partition wall member at a side of the supplementary oil storage; and a relief valve which opens the flow passage when pressure in the reservoir increases to more than a predetermined value, wherein the relief valve includes:

a valve seat formed on a shoulder between the flow passage and the press-fit bore on the partition wall member and facing the side of the supplementary oil storage;

a hollow valve case surrounding the valve seat and press-fitted at one end into the press-fit bore of the partition wall member, the hollow valve case being located entirely inside the supplementary oil storage; and a valve body disposed in the hollow valve case, the valve body being urged by a spring so as to be seated at the valve seat.

2. The hydraulic shock absorber with the self leveling function for the vehicle height as defined in claim 1, wherein the hollow valve case supports one end of the spring located in the hollow valve case and urging the valve body.

3. The hydraulic shock absorber with the self leveling function for the vehicle height as defined in claim 2, wherein an urging force of the spring is adjusted by changing a press-fit amount of the hollow valve case into the press-fit bore.

* * * * *